United States Patent
Kim (10) Patent No.: US 11,127,294 B2
(45) Date of Patent: Sep. 21, 2021

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventor: Hongbum Kim, Ansan-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 344 days.

(21) Appl. No.: 16/202,517

(22) Filed: Nov. 28, 2018

(65) Prior Publication Data

US 2020/0114886 A1  Apr. 16, 2020

(30) Foreign Application Priority Data

Oct. 10, 2018  (KR) ......................... 10-2018-0120196

(51) Int. Cl.
| | |
|---|---|
| *G08G 1/16* | (2006.01) |
| *G05D 1/02* | (2020.01) |
| *G01S 13/06* | (2006.01) |
| *G01S 13/50* | (2006.01) |
| *G01S 15/06* | (2006.01) |
| *G01S 17/06* | (2006.01) |
| *G01S 17/50* | (2006.01) |
| *G01S 15/50* | (2006.01) |
| *B60W 30/095* | (2012.01) |
| *G01S 13/931* | (2020.01) |

(52) U.S. Cl.
CPC ......... *G08G 1/161* (2013.01); *B60W 30/0956* (2013.01); *G01S 13/06* (2013.01); *G01S 13/50* (2013.01); *G01S 15/06* (2013.01); *G01S 15/50* (2013.01); *G01S 17/06* (2013.01); *G01S 17/50* (2013.01); *G05D 1/0214* (2013.01); *G05D 1/0231* (2013.01); *G05D 1/0276* (2013.01); *G08G 1/163* (2013.01); *G08G 1/167* (2013.01); *G01S 2013/9315* (2020.01); *G01S 2013/9316* (2020.01)

(58) Field of Classification Search
CPC ........ G08G 1/161; G08G 1/163; G08G 1/167; G05D 1/0231; G05D 1/0276; G05D 1/0214; B60W 30/0956; G01S 12/06; G01S 13/50; G01S 15/06; G01S 15/50; G01S 17/06; G01S 17/50; G01S 2013/9315; G01S 2013/9316
See application file for complete search history.

(56) References Cited

U.S. PATENT DOCUMENTS

| | | | | |
|---|---|---|---|---|
| 7,994,902 B2* | 8/2011 | Avery et al. | ........... | G08G 1/161 340/903 |
| 9,760,092 B2* | 9/2017 | Ferguson et al. | ...... | G08G 1/167 |

(Continued)

*Primary Examiner* — Dale W Hilgendorf (57) ABSTRACT

A vehicle and a control method of the vehicle obtains information on a target object in a blind spot based on a result of object detection by the vehicle itself and a result of object detection received from another vehicle. In particular, to the vehicle performs a safe driving control based on the obtained information on the target object. The method of controlling the vehicle may include: setting a blind spot around the vehicle based on the detection result of the object around the vehicle, and performing the safe driving control of the vehicle based on the degree of risk of the target object in the blind spot.

18 Claims, 11 Drawing Sheets

(56) References Cited

U.S. PATENT DOCUMENTS

| | | | |
|---|---|---|---|
| 10,431,018 B1* | 10/2019 | Fields et al. | B60W 30/0956 |
| 2008/0288140 A1* | 11/2008 | Matsuno | G08G 1/167 |
| | | | 701/301 |
| 2009/0058677 A1* | 3/2009 | Tseng et al. | G08G 1/167 |
| | | | 340/904 |
| 2010/0214085 A1 | 8/2010 | Avery et al. | |
| 2011/0128138 A1* | 6/2011 | Yamamoto et al. | |
| | | | B60W 30/0956 |
| | | | 340/436 |
| 2013/0194127 A1* | 8/2013 | Ishihara et al. | |
| | | | G01S 2013/9315 |
| | | | 342/70 |
| 2017/0369067 A1* | 12/2017 | Saigusa et al. | B60W 30/0956 |
| 2018/0151077 A1* | 5/2018 | Lee | G08G 1/161 |
| 2019/0259283 A1* | 8/2019 | Sung et al. | G08G 1/166 |
| 2019/0315345 A1* | 10/2019 | Newman et al. | B60W 30/0956 |
| 2020/0086857 A1* | 3/2020 | Sugira et al. | B60W 30/0956 |

\* cited by examiner

VEHICLE AND CONTROL METHOD THEREOF

CROSS-REFERENCE TO RELATED APPLICATION

This application claims priority to and the benefit of Korean Patent Application No. 10-2018-0120196, filed on Oct. 10, 2018, the entirety of which is incorporated herein by reference.

FIELD

Forms of the present disclosure relate to a vehicle and safe driving control of a vehicle.

BACKGROUND

The statements in this section merely provide background information related to the present disclosure and may not constitute prior art.

With the development of sensor technology, various sensors are installed in a vehicle and have been provided a variety of information for safety driving. For example, the sensors obtain information on the vicinity of vehicle using a camera, radio detection and ranging (RADAR), light imaging detection and ranging (LiDAR), and the like and control a vehicle by analyzing the obtained information, thereby preventing an accident.

However, we have discovered that the vehicle may not sufficiently react to an object positioned in a blind spot only through object detection by the vehicle itself.

SUMMARY

The present disclosure provides a vehicle and a control method thereof capable of obtaining information on a target object in a blind spot using an object detection result by a vehicle itself and an object detection result received from another vehicle, and performing safe driving control based on the obtained information on the target object.

Additional aspects of the disclosure will be set forth in part in the description which follows and, in part, will be obvious from the description, or may be learned by practice of the disclosure.

In accordance with one aspect of the present disclosure, a method of controlling a vehicle includes: setting a blind spot in a vicinity of a vehicle based on a detection result of an object around the vehicle, and performing a safe driving control of the vehicle based on the degree of risk of a target object in the blind spot.

The detection result of the object around the vehicle may include a detection result of the object by the vehicle itself and a detection result of the object by another vehicle around the vehicle.

The operation of performing safe driving control of the vehicle may include filtering the target object which is in the blind spot or expected to enter the blind spot based on the detection result of the object and setting a range of the filtered target object.

The performing safe driving control of the vehicle may further include determining the degree of risk of the target object based on the number of sensors detecting the target object, a type of sensors configured to detect the target object, and a detection frequency.

When the target object is detected by a plurality of sensors, the degree of risk of the target object may be set as a first degree of risk.

When the target object is detected by a single sensor, the degree of risk of the target object may be set as a second degree of risk lower than the first degree of risk.

When the target object is detected by the single sensor and is detected at a predetermined frequency for a predetermined time, the degree of risk of the target object may be set as the first degree of risk lower than the second degree of risk.

The safe driving control includes reflecting the degree of the risk, and selectively collecting and managing at least one of generating a warning, reducing a speed, easing an entry condition of a brake assistance system, and eccentric driving of the vehicle according to the degree of the risk of the target object.

In accordance with another aspect of the present disclosure, a vehicle includes a sensor for detecting an object around a vehicle, a communicator for communicating with another vehicle, and a controller configured to set a blind spot in a vicinity of the vehicle based on a detection result of the object by the sensor and configured to perform safe driving control of the vehicle in consideration of the degree of risk of a target object in the blind spot.

The detection result of the object around the vehicle may include a result of object detection by the vehicle itself and a result of object detection by another vehicle around the vehicle.

The controller, for the safe driving control of the vehicle, may filter the target object which is in the blind spot or expected to enter the blind spot based on the detection result of the object and may set a range of the filtered target object.

The controller, for the safe driving control of the vehicle, may determine the degree of risk of the target object based on the number of sensors detecting the target object, the type of sensors, and a detection frequency.

The controller may set the degree of risk of the target object as a first degree of risk when the target object is detected by a plurality of sensors.

The controller may set the degree of risk of the target object as a second degree of risk lower than the first degree of risk when the target object is detected by a single sensor.

The controller may set the degree of risk of the target object as the first degree of risk lower than the second degree of risk when the target object is detected by a single sensor and is detected at a predetermined frequency for a predetermined time.

The controller may selectively collect and manage at least one of generating a warning, reducing a speed, easing an entry condition of a brake assistance system, and eccentric driving of the vehicle according to the degree of the risk of the target object.

In accordance with still another aspect of the present disclosure, a method of controlling a vehicle includes: setting a blind spot in a vicinity of a vehicle based on a detection result of an object around the vehicle; determining a degree of risk of a target object based on the number of sensors detecting a target object in the blind spot, the type of sensors, and a detection frequency; and performing a safe driving control of the vehicle by selectively collecting and managing some or all of generating a warning, reducing a speed, easing an entry control of a brake assisting system, and eccentric driving of the vehicle according the degree of the risk of the target object.

The detection result of an object around the vehicle may include a result of object detection by the vehicle itself and a result of object detection by another vehicle around the vehicle.

In accordance with still another aspect of the present disclosure, a vehicle includes a sensor for detecting an object around a vehicle, a communicator for communicating with another vehicle, and a controller configured to set a blind spot around the vehicle based on a detection result of the object around the vehicle. In particular, the controller may determine a degree of risk of a target object based on the number of sensors detecting the target object in the blind spot, the type of sensors, and a detection frequency, and also perform a safe driving control of the vehicle by selectively collecting and managing some or all of generating a warning, reducing a speed, easing an entry condition of a brake assisting system, and eccentric driving of the vehicle according to the degree of the risk of the target object.

The detection result of the object around the vehicle may include a result of object detection by the vehicle itself and a result of object detection by another vehicle around the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
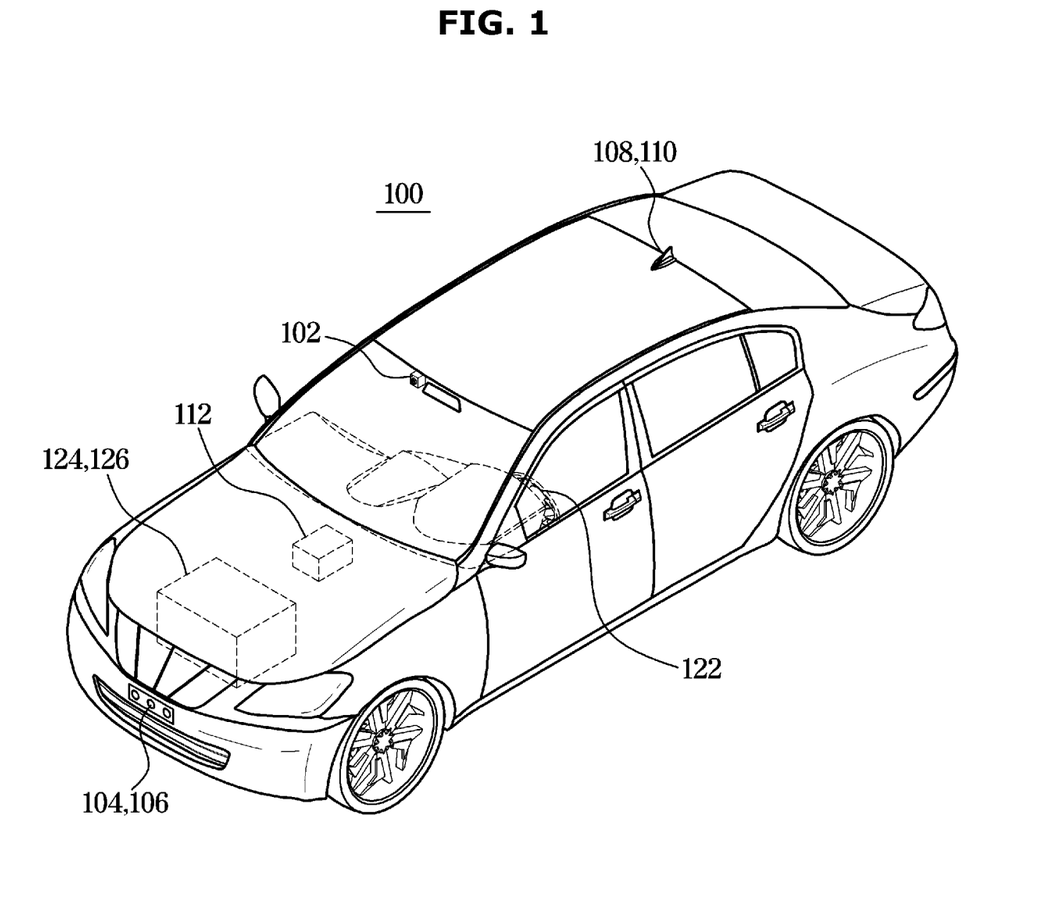
FIG. 1 is a view illustrating a vehicle.

FIG. 1 is a view illustrating a vehicle in one form of the present disclosure. As shown in FIG. 1, a vehicle 100 includes a front camera 102, a front radio detection and ranging (RADAR) 104, a front light imaging detection and ranging (LiDAR) 106, a global positioning system (GPS) device 108, a vehicle-to-everything (V2X) device 110, a controller 112, motor driven power steering (MDPS) 122, electronic stability control (ESC) 124, and a power train 126. Each of the devices will be described in detail with reference to FIG. 2 described below.

Figure 2:
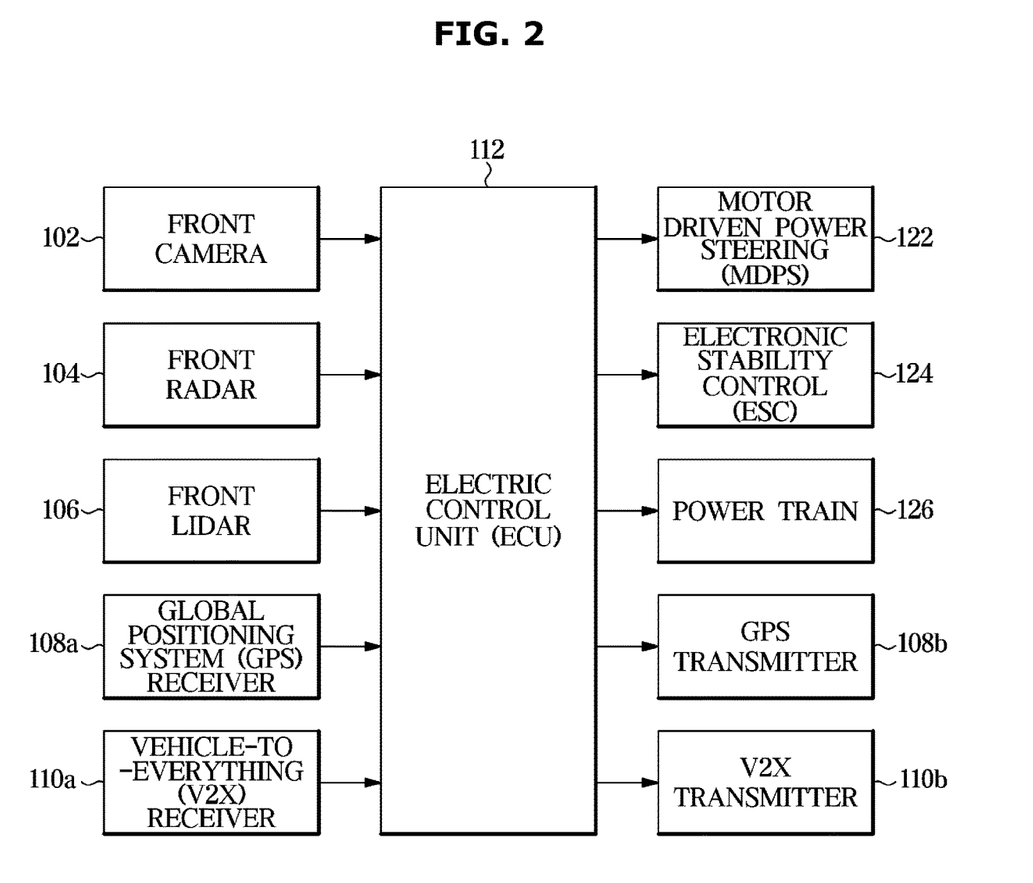
FIG. 2 is a view illustrating a control system of the vehicle.

FIG. 2 is a view illustrating a control system of the vehicle in one form of the present disclosure.

The controller 112 is provided to control operation of the vehicle 100. The controller 112 transmits or receives information by communicating with the front camera 102, the front RADAR 104, the front LiDAR 106, the GPS device 108, and the V2X device 110. Further, the controller 112 may control the MDPS 122, the ESC 124, and the power train 126 by generating a control command for controlling the MDPS 122, the ESC 124, and the power train 126. The controller 112 may be an electronic control unit (ECU) provided in the vehicle 100.

The front camera 102 may be installed in the vicinity of a rear-view mirror in an interior space of the vehicle 100 or may be integrally provided in the rear-view mirror. The front camera 102 may be provided to generate an image by capturing an image of a front side of the vehicle 100.

The front RADAR 104 may be installed in an air inlet or a radiator grille on the front side of the vehicle 100. The front RADAR 104 detects another vehicle driving in front of the vehicle 100 and is used to measure a driving speed of the vehicle and a distance to the vehicle. Further, the front RADAR 104 may detect a pedestrian positioned in front of the vehicle 100.

The front LiDAR 106 may be installed in the air inlet or the radiator grille on a front portion of the vehicle 100. The front LiDAR 106 detects another vehicle driving in front of the vehicle 100 and is used to measure a driving speed of the vehicle and a distance to the vehicle. Further, the front LiDAR 106 may detect a pedestrian positioned in front of the vehicle 100.

The GPS device 108 is provided to communicate with a GPS satellite. The GPS device 108 includes a GPS receiver 108a and a GPS transmitter 108b.

The V2X device 110 is provided to perform V2X communication. The V2X communication refers to 'vehicle to everything', and may translate as 'communication between a vehicle and an object (a person)'. The V2X device 110 includes a V2X receiver 110a and a V2X transmitter 110b. The V2X communication will be described in detail with reference to FIG. 3 described below.

The MDPS 122 is a device configured to assist a direction changing performance of the vehicle 100 by controlling a steering wheel by appropriately operating a motor in consideration of a speed of vehicle and the like according to a signal detected by a sensor connected to the steering wheel.

The ESC 124 is a device configured to stably maintain an upright position of a vehicle body to prevent the vehicle body from losing its balance due to sudden driving of the vehicle when an obstacle suddenly appears or an accident occurs in front of the vehicle while driving, or the vehicle 100 should quickly move in a slippery road. The ESC 124 may maintain high stability of the vehicle 100 even when the vehicle 100 is suddenly driven.

The power train 126, which is a series of devices configured to transfer power to the vehicle 100, may include a clutch, a torque converter, a transmission, a propeller shaft, a drive shaft, a differential, and the like, of the vehicle 100.

Figure 3:
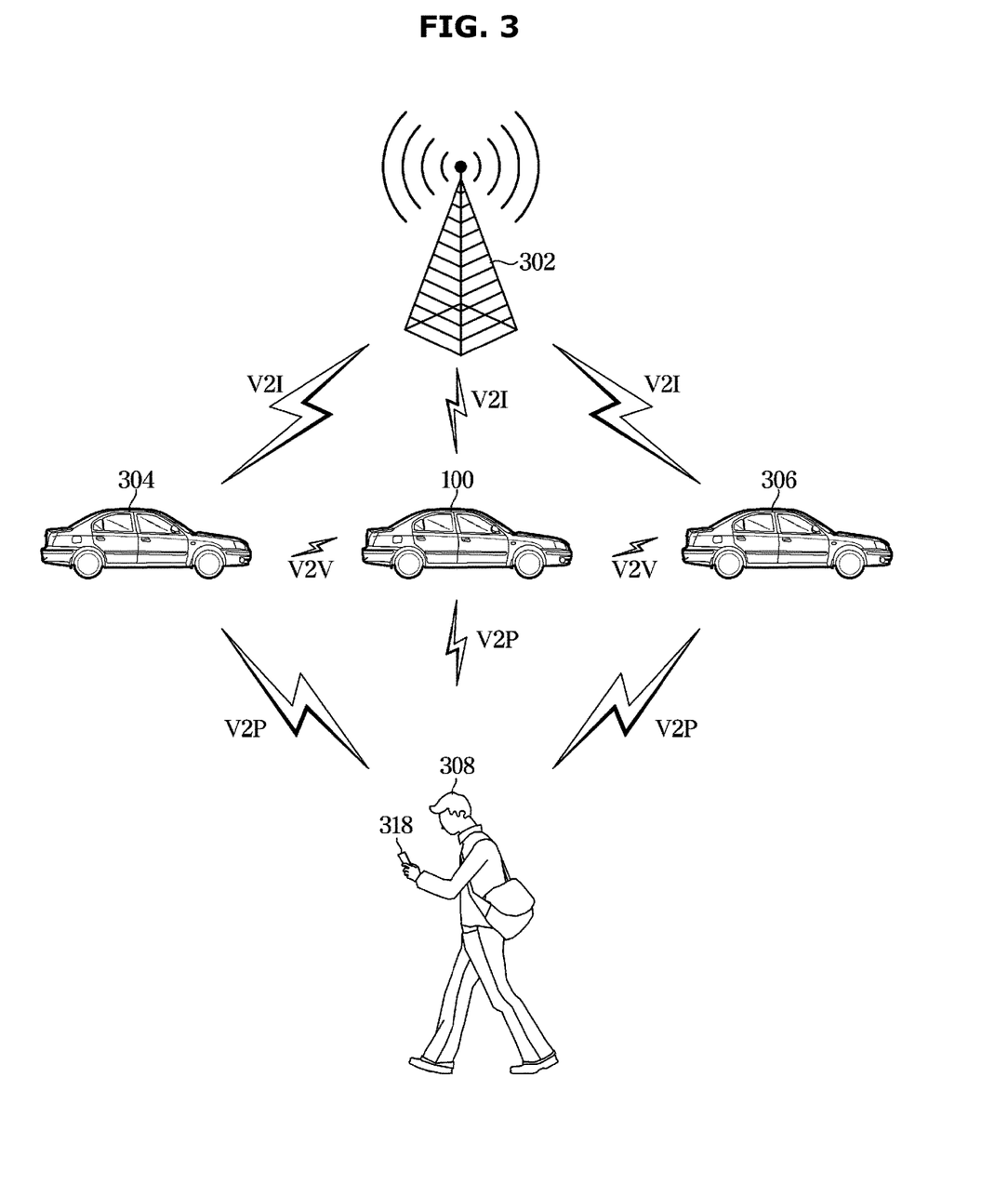
FIG. 3 is a view illustrating vehicle-to-everything (V2X) communication of the vehicle.

FIG. 3 is a view illustrating vehicle-to-everything (V2X) communication of the vehicle according to one exemplary form of the present disclosure.

The V2X communication refers to 'vehicle to everything', and may translate as 'communication between a vehicle and an object (a person)'. As shown in FIG. 3, the V2X communication is technology in which the driving vehicle 100 exchanges and shares road infrastructure or traffic information, pedestrian information, and the like through wireless communication. The V2X communication is implemented on the basis of a vehicle, such as vehicle to infrastructure (V2I), vehicle to vehicle (V2V), vehicle to pedestrian V2P, and the like.

In the vehicle 100, information on a surrounding situation of the vehicle 100 is exchanged through the V2X communication with a mobile device 318 of a pedestrian 308, other vehicles 304 and 306, or a V2X base station 302 around the vehicle. The vehicle 100 performs V2I communication with the V2X base station 302, performs V2V communication with the other vehicles 304 and 306, and performs V2P communication with the mobile device 318 of the pedestrian 308. Strictly, the V2P communication is communication with the mobile device 318 that the pedestrian 308 carries rather than communication with the pedestrian 308.

The vehicle 100 performs two-way communication promoting a safe and pleasant driving environment by exchanging messages through the V2I communication, V2V communication, and V2P communication.

Figure 4:
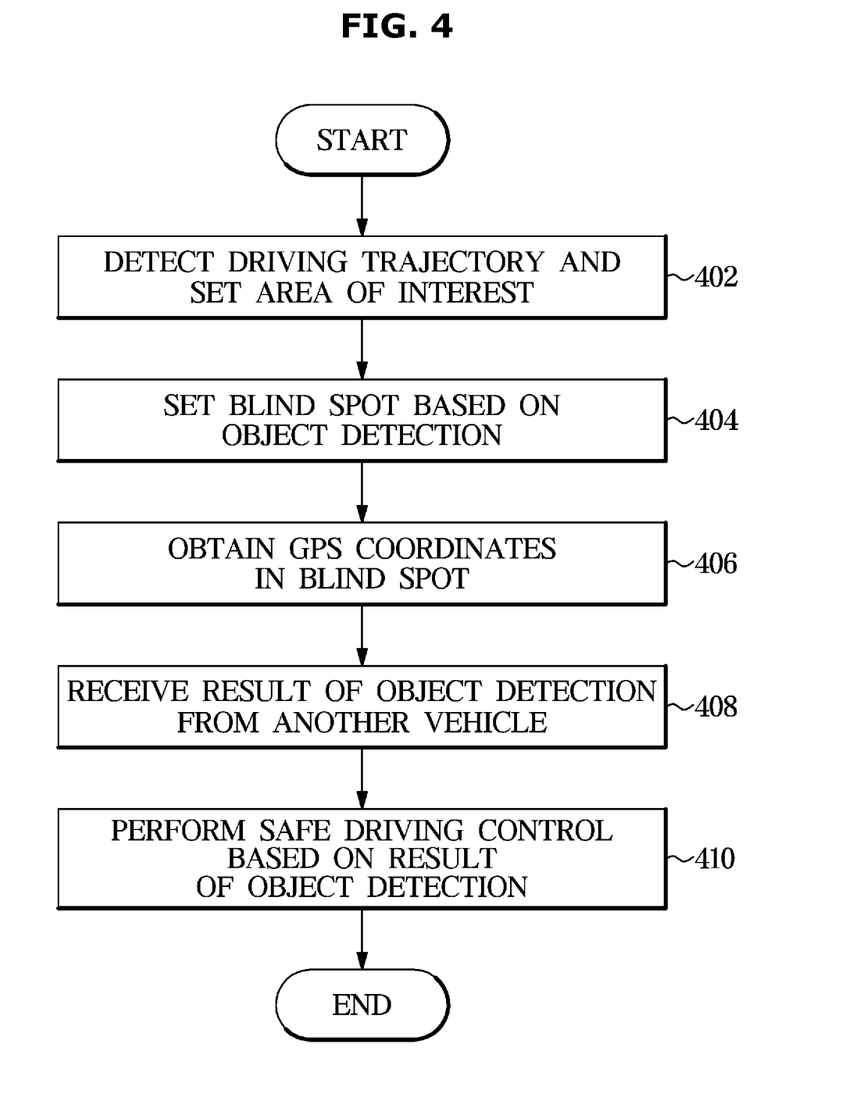
FIG. 4 is a view illustrating a method of controlling the vehicle.

FIG. 4 is a view illustrating a method of controlling the vehicle in one form of the present disclosure. According to the method of controlling the vehicle shown in FIG. 4, a blind spot is set on the basis of a detection result of an object in a driving trajectory and an area of interest and safety driving of the vehicle 100 can be controlled according to the degree of risk of a moving object in the set blind spot.

The vehicle 100 detects a driving trajectory of the vehicle 100 and sets an area of interest on the driving trajectory in front of the vehicle 100 (402).

Figure 5:
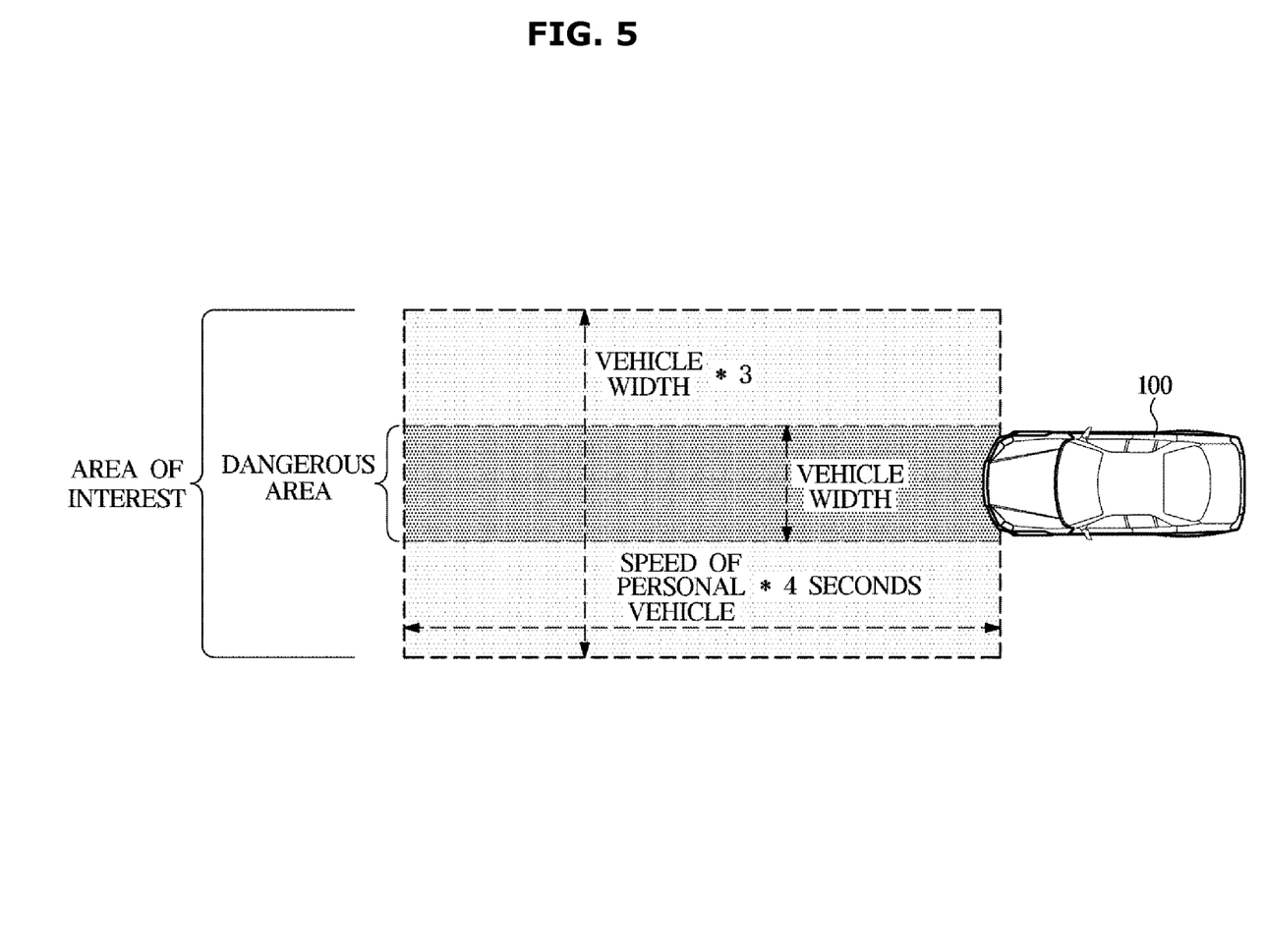
FIG. 5 is a view illustrating an area of interest set by the vehicle.

FIG. 5 is a view illustrating the area of interest set by the vehicle (100) in another form of the present disclosure. As shown in FIG. 5, the area of interest is set on a driving trajectory in front of the vehicle 100. A width of the area of interest, which is a size large enough for the vehicle to quickly avoid the obstacle, may be, for example, three times a width of the vehicle. A length of the area of interest, which is a size large enough for the vehicle to quickly avoid the obstacle, may be, for example, a distance that the vehicle 100 moves for four seconds at a current speed. The size of the area of interest is not limited to the values. The area of the width of one vehicle in the middle of the width of the area of interest may be defined as a dangerous area. When the obstacle is in the dangerous area, risk of an accident is high, and thus it is desired for the vehicle 100 to focus more on such an area.

Returning to FIG. 4, the vehicle 100 sets a blind spot based on object detection (404).

Figure 6:
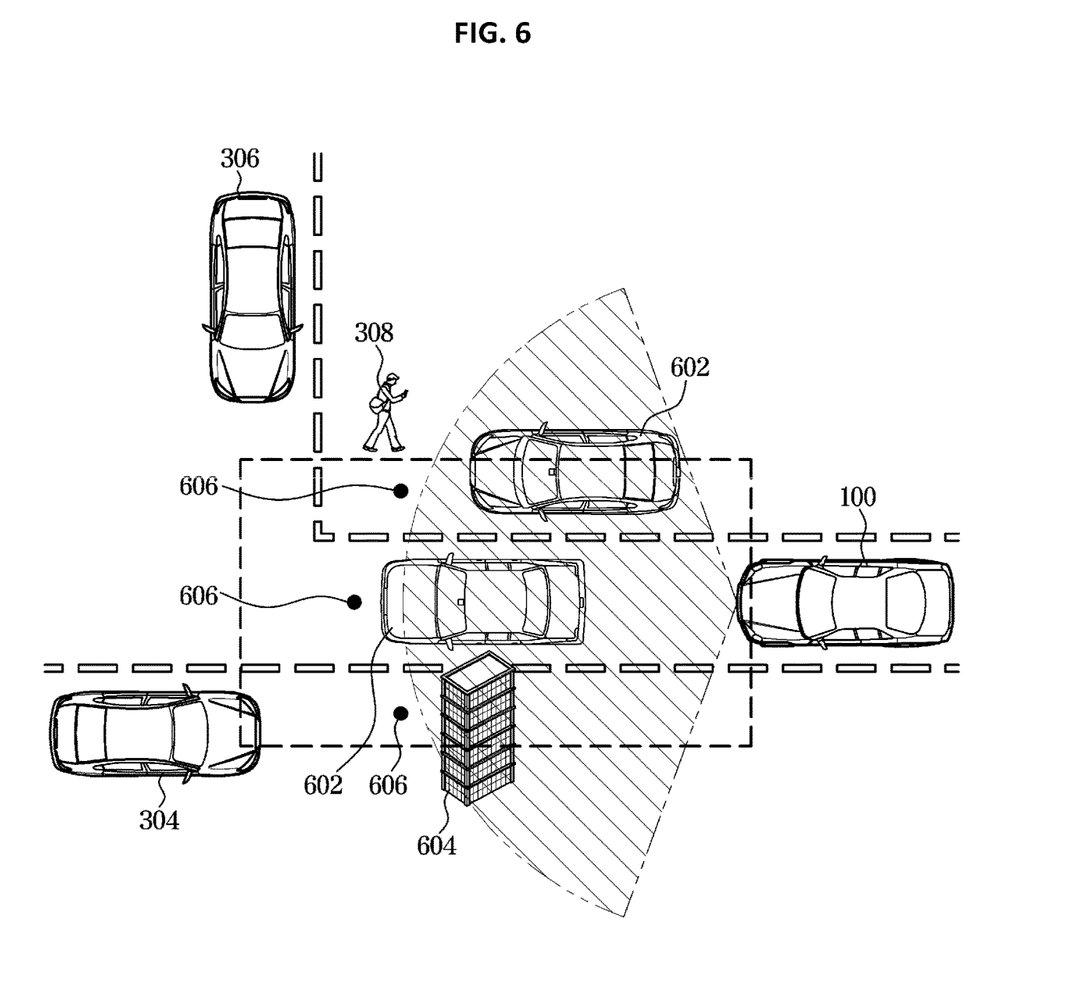
FIG. 6 is a view illustrating a set blind spot of the vehicle.

FIG. 6 is a view illustrating a set blind spot of the vehicle according to another exemplary form of the present disclosure. As shown in FIG. 6, blind spots 606 made by another vehicle 602 and a building 604 in front of the vehicle 100 may be set. The blind spot is set in the area of interest based on the result of object detection (the result of obstacle detection) detected by the front camera 102, the front RADAR 104, or the front LiDAR 106.

The object detection, which is information on the moving object, may include information on distinction, a position, a speed, a direction, and a type of detecting sensors. The distinction information may include a pedestrian, a bicycle, a vehicle, a motor cycle, and the like. The position information may include GPS coordinates. The information on the detecting sensor indicates which one of the front camera 102, the front RADAR 104, and the front LiDAR 106 is used.

Returning to FIG. 4, the vehicle 100 obtains GPS coordinates of the blind spot set in the area of interest (406). The information on a relative size and distance of the area of interest for the vehicle 100 is secured, the blind spot is in the area of interest, and the GPS coordinates of the vehicle 100 are obtained, and thus the vehicle may easily obtain GPS coordinates of the blind spot.

Further, the vehicle 100 receives an object detection result (for example, information on the moving object) from the vehicles 304 and 306 (408). As shown in FIG. 6 described above, each of the vehicles 304 and 306 detects an object and transfers an object detection result to surrounding vehicles through the V2X communication. The vehicle receives the object detection result transferred from the surrounding vehicles 304 and 306, that is, the information on the moving object.

Referring to FIG. 4, the vehicle 100 performs safe driving control to safely control the vehicle 100 based on the result of autonomously performed object detection and the result of object detection received from the vehicles 304 and 306 (410). The safe driving control of the vehicle 100 will be described in detail with reference to FIGS. 7A and 7B described below.

Figure 7A:
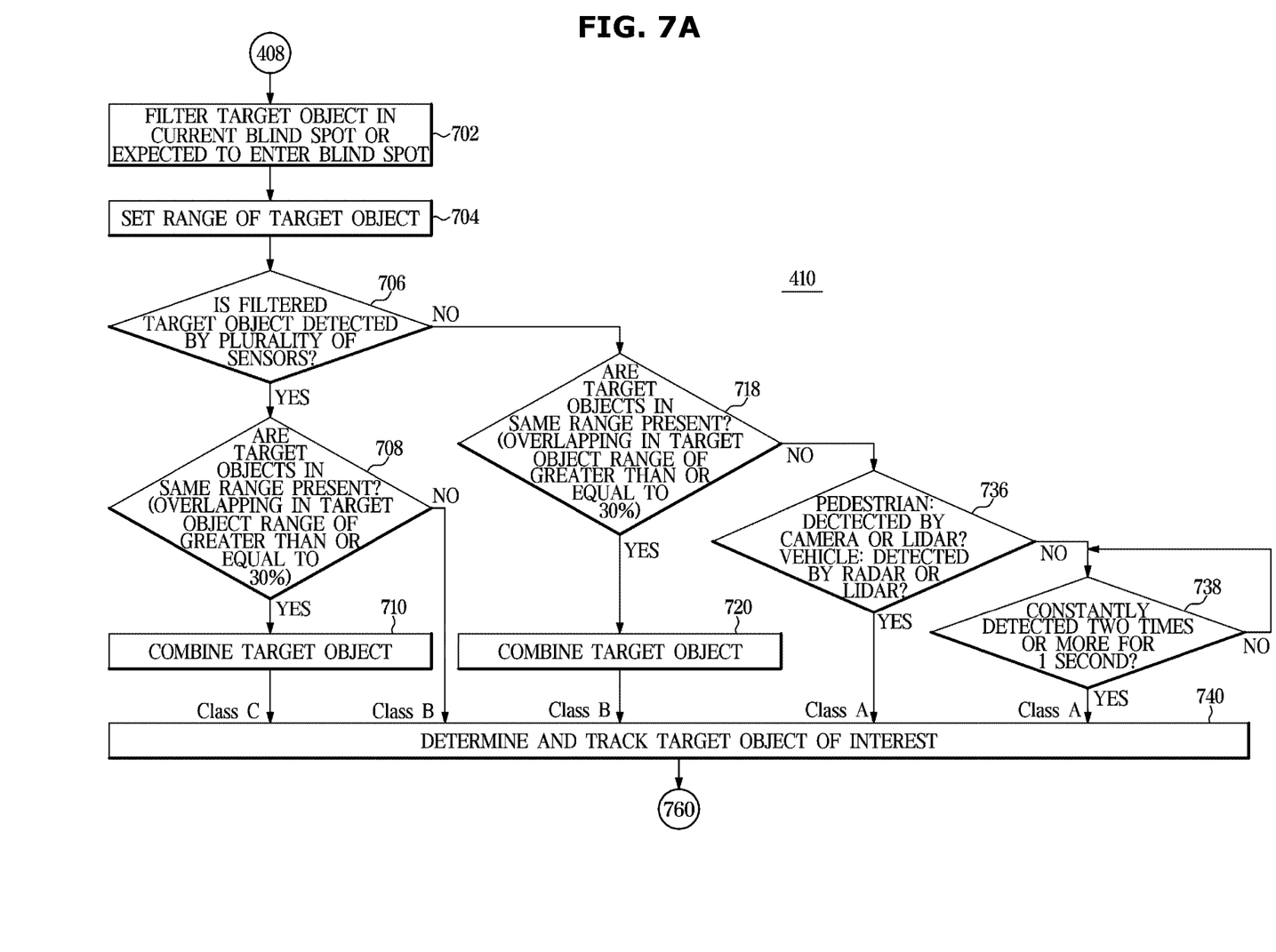
FIGS. 7A and 7B are views illustrating safe driving control of the vehicle.
Figure 7B:
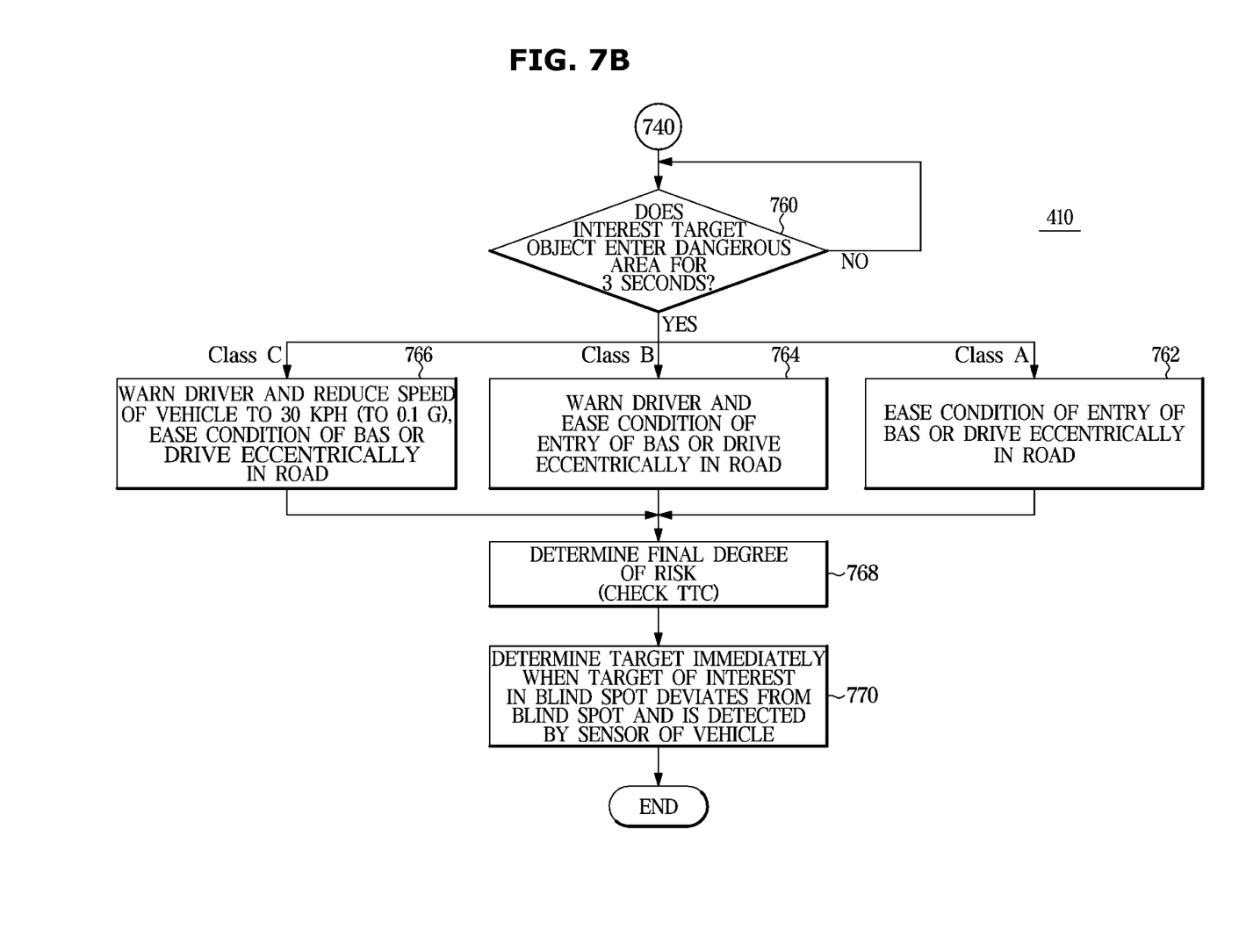

FIGS. 7A and 7B are views illustrating a safe driving control of the vehicle in one form of the present disclosure, as referred to at step 410 in FIG. 4A. FIG. 7A is a view illustrating the degree of risk classification based on the result of object detection, and FIG. 7B is a view illustrating safe driving control based on the result of the degree of risk classification.

First, as shown in FIG. 7A, the controller 112 of the vehicle 100 performs filtering on a target object (a moving object) which is in a current blind spot or is expected to enter the blind spot based on the result of object detection (702). The filtering is to determine the degree of risk by selecting only an object desiring particular attention of the detected target objects. The result of object detection may include a result of object detection by the vehicle 100 itself and a result of object detection received from the vehicles 304 and 306.

Figure 8A:
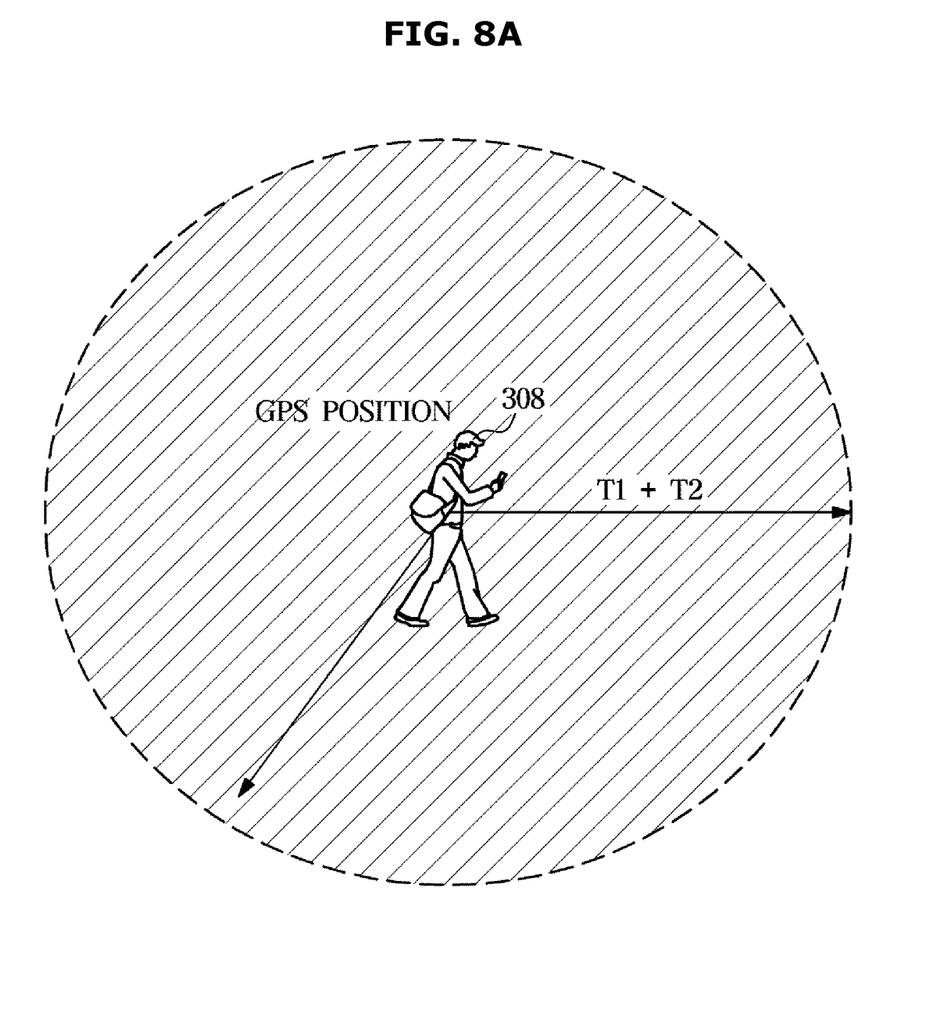
FIGS. 8A and 8B are views illustrating setting of a range of a target object.
Figure 8B:
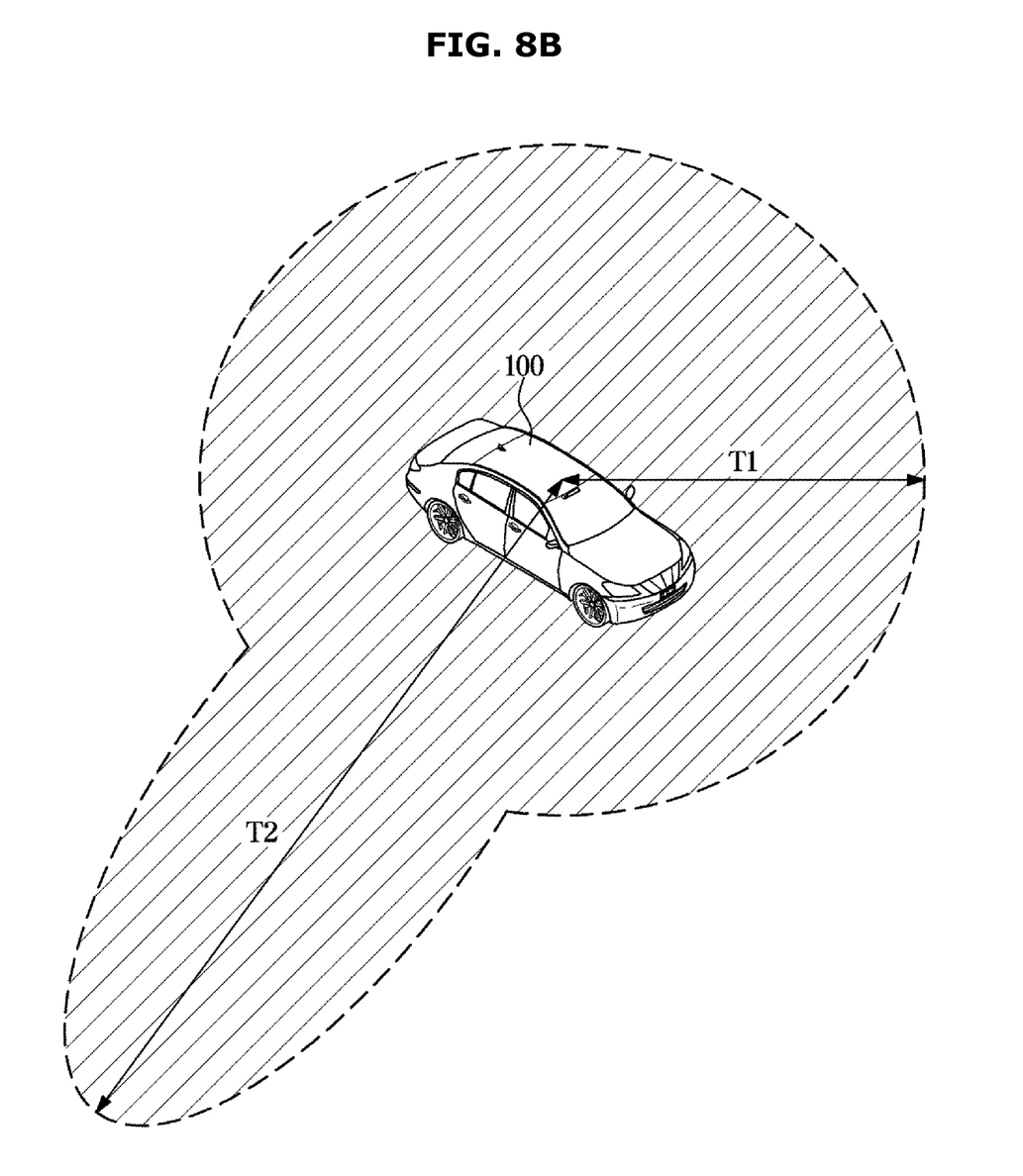

The controller 112 sets a range of filtered target object (704). The range of the target object may be set differently according to classification of the target object. FIGS. 8A and 8B are views illustrating setting of a range of a target object. As shown in FIG. 8A, when the target object is a pedestrian, a range of the pedestrian is represented by a circle with a radius of T1+T2 around the pedestrian. T1 may be a predetermined distance (for example, 1 m), T2 may be a distance (speed*1 second) that the pedestrian moves for a predetermined time (for example, 1 second). Further, as shown in FIG. 8B, when the target object is a vehicle (or a motorcycle), a range of the vehicle is represented by a combination of a circle with a radius of T1 and an eclipse with a radius of T2 around the vehicle. T1 may be a predetermined distance (for example, 5 m), and T2 may be a distance (speed*3 seconds) that the vehicle moves for a predetermined time (for example, 3 seconds).

Returning to 7A, the controller 112 checks whether the filtered target object is detected by a plurality of sensors (706). That is, the controller 112 checks whether the filtered target object is detected by two or more sensors of the front camera 102, the front RADAR 104, and the front LiDAR 106. That's because a result obtained when the target object is detected by the plurality of sensors may be more accurate than when the target object is detected by a single sensor.

Figure 9:
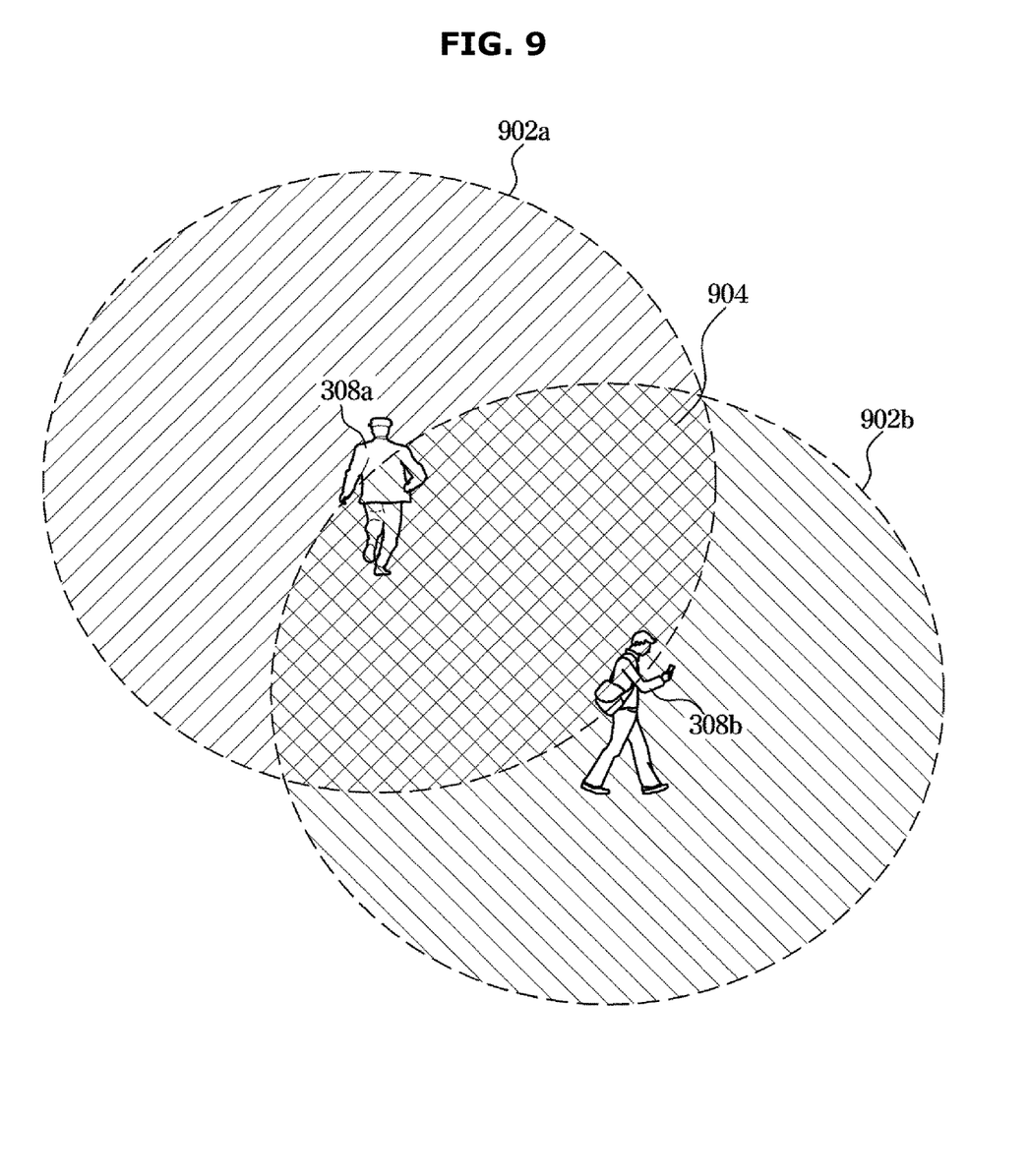
FIG. 9 is a view illustrating a case in which ranges of target objects are the same.

When the filtered target object is a target object detected by the plurality of sensors ('example' of 706), the controller 112 checks whether the target objects in the same range of the target objects detected by the plurality of sensors are present (708). Criteria for determining whether ranges of the target objects are the same may determine whether the ranges of target objects are the same when ranges of the target objects overlap in a predetermined amount (for example, 30%). FIG. 9 is a view illustrating a case in which ranges of target objects are the same. As shown in FIG. 9, when a range 902*a* of a first pedestrian 308*a* and a range 902*b* of a second pedestrian 308*b* overlap by greater than or equal to 30% as an overlapping area 904, the first pedestrian 308*a* and the second pedestrian 308*b* may have the same range. In the case of the pedestrian, when the ranges of the first and second pedestrians overlap by greater than or equal to 30%, it may be understood that the pedestrians are actually in the same range. When the target object is a vehicle, criteria of overlapping area for determining the same range may have values other than 30%.

Returning to FIG. 7A, when it is determined that the target objects in the same range of the detected target objects detected by the plurality of sensors are present, the controller 112 combines the target objects in the same range into one target object (710). That is, target objects having the ranges overlapping greater than or equal to a predetermined range are treated as one target object. In FIG. 7A, the target object which have undergone the operations of 706, 708, and 710 are classified as Class C.

When the target objects in the same range are not present ('no' of 708) in the operation of 708, the controller 112 classifies the target objects as Class B.

In FIG. 7A, when the filtered target objects are target objects detected by a single sensor ('no' of 706), the controller 112 checks whether target objects in the same range of the target objects detected by the single sensor are present (718). Criteria for determining whether the target objects are in the same range may determine that the target objects have the same range when the ranges of the target objects overlap by greater than or equal to a predetermined amount (for example, 30%). As shown in FIG. 9 described above, when the range 902*a* of the first pedestrian 308*a* and the range 902*b* of the second pedestrian 308*b* overlap by greater than or equal to 30% in the overlapping area (904), the first pedestrian 308*a* and the second pedestrian 308*b* may have the same range. In the case of the pedestrian, when the ranges of the first and second pedestrians overlap greater than or equal to 30%, it may be understood that the pedestrians are actually in the same range. When the target object is a vehicle, criteria of overlapping area for determining the same range may have values other than 30%.

Returning to 7A, when it is determined that the target objects in the same range of the target objects detected by the single sensor are present, the controller 112 combines the target objects in the same range into one target object (720). That is, the target objects having ranges overlapping by greater than or equal to a predetermined range are treated as one target object. In FIG. 7A, the target objects which have undergone the operations of 706, 718, and 720 are classified as Class B.

When the target objects in the same range are not present in the operation of 718 ('no' of 718), the controller 112 checks which sensor detects the target objects (736). For example, when the target object is a pedestrian, the controller 112 checks that the pedestrian is detected by the front camera 102 or the front LiDAR 106. When the target object is a vehicle, the controller 112 checks that the vehicle is detected by the front RADAR 104 or the front LiDAR 106.

When the pedestrian is detected by the front camera 102 or the front LiDAR 106, or the vehicle is detected by the front RADAR 104 or the front LiDAR 106 ('yes' of 736), the controller 112 classifies the relevant target object as Class A.

When the pedestrian is not detected by the front camera 102 or the front LiDAR 106, or the vehicle is not detected by the front RADAR 104 or the front LiDAR 106 ('no' of 736), the controller 112 (112) checks whether the relevant target objects are constantly detected to be greater than or equal to a predetermined number (for example, two) for a predetermined time (for example, 1 sec) (738). When the relevant target objects are constantly detected to be greater than or equal to a predetermined number (for example, two) for a predetermined time (for example, 1 sec), the controller 112 classifies the target objects as Class A.

The target objects are classified as Class A, Class B, and Class C according to states of the target objects so that the target object of interest is determined, and target detection information is secured while the determined target objects of interest are constantly tracked (740). Classifying the target objects into Class A (third degree of risk), Class B (second degree of risk), and Class C (first degree of risk), which is classification of the degree of risk (or extent that attention is desired) of the target objects, is to apply different levels of safe driving control according to the degree of each risk of the target objects. The degree of risk proceeds from Class C>Class B>Class A in order. Such an order will be described in more detail with reference to FIG. 7B described below.

FIG. 7B is a view illustrating safe driving control based on a result of the degree of risk classification.

When the target object of interest is expected to enter the dangerous area (see FIG. 5) for a predetermined time (for example, 3 seconds) in a state in which the target object of interest is determined and tracked ('yes' of 760), the controller 112 performs different levels of safe driving control according to classification of the relevant target object of interest as shown in 762, 764, and 766 in FIG. 7B. As described above, the degree of risk (or extent that attention is desired) proceeds from Class C>Class B>Class A in order.

When the target object of interest is classified as Class A, the controller 112 eases an entry condition of a brake assistance system (BAS) by determining that the degree of risk is relatively low or performs eccentric driving in a road (762). That is, in the case of Class A, the controller 112 determines that the degree of risk is not high enough to ease an entry condition of the BAS, thereby delaying an intervention time of the BAS. In one form, the controller 112 may allow the vehicle 100 to more easily avoid the target object of interest by allowing the vehicle 100 to perform the eccentric driving that is biased to the left side or the right side of the road rather than in a center of the road.

When the target object of interest is classified as Class B, the controller 112 generates a warning and eases an entry condition of BAS or performs eccentric driving in a road by determining that the degree of risk is relatively low (764). That is, in the case of Class B, the controller 112 determines that the degree of risk is relatively high, thereby generating a warning to a driver to call the driver's attention, inducing the driver's active reaction, and easing an entry condition of the BAS to delay an intervention time of the BAS. The controller 112 may allow the vehicle 100 to more easily avoid the target object of interest by allowing the vehicle 100 to drive to be biased to the left side or the right side rather than in the center of the road.

When the target object of interest is classified as Class C, the controller 112 generates a warning to a driver, reduces a speed of the vehicle 100 to a predetermined speed (for example, 30 kph), and eases an entry condition of the BAS or performs eccentric driving in the road by determining that the degree of risk is very high (766). That is, in the case of Class C, the controller 112 determines that the degree of risk is very high, thereby generating a warning to a driver to call the driver's attention, inducing the driver's active reaction, reducing a speed of the vehicle 100, and easing an entry condition of the BAS to delay an intervention time of the BAS. The reduction of the speed of the vehicle 100 may be decelerated to a state in which predetermined longitudinal acceleration (for example, 0.1 g) is maintained. Otherwise, the controller 112 may allow the vehicle 100 to more easily avoid the target object of interest by allowing the vehicle 100 to drive to be biased to the left side or the right side rather than in the center of the road.

The controller 112 finally determines which one of Class A, Class B, and Class C the degree of risk of the current target object of interest corresponds to (768). The controller 112 selects any one of safe driving controls of 762, 764, and 766 according to the finally determined degree of risk to allow the vehicle 100 to perform safe driving control at a level suitable for the surrounding target objects of interest. The controller 112 may use time to collision (TTC) information for the final determination of the degree of risk.

When the target object of interest, which is in the blind spot or expected to enter the blind spot soon, deviates from the blind spot and is detected by the sensor of the vehicle 100, the controller 112 determines the degree of risk by immediately selecting the relevant target object of interest as a target and performs safe driving control (770). Since a situation in which the target object of interest deviates from the blind spot and is detected by the sensor of the vehicle 100 may desire more active and aggressive reaction for the relevant target object of interest, it is desired to determine the degree of risk by immediately selecting the target object of interest as a target and to perform safe driving control.

As is apparent from the above description, a vehicle obtains information on a target object in a blind spot based on a result of object detection by the vehicle itself and a result of object detection received from another vehicle and performs safe driving control based on information on the obtained information on target object.

While the present disclosure has been particularly described with reference to exemplary forms, it should be understood by those of skilled in the art that various changes, modifications, and replacements in form and details may be made without departing from the spirit and scope of the present disclosure. Therefore, the exemplary forms and claims disclosed in the present disclosure should be considered in a descriptive sense only and not for purposes of limitation. Accordingly, the scope of the present disclosure is not limited by the forms and the accompanying drawings. The scope of the present disclosure should be defined by the appended claims, and encompasses all modifications and equivalents that fall within the scope of the present disclosure.

What is claimed is:

1. A method of controlling a vehicle, the method comprising:
   setting a blind spot in a vicinity of the vehicle based on a detection result of an object around the vehicle;
   detecting a target object which is in the blind spot, or expected to enter the blind spot;
   determining a degree of risk of the target object based on a number of sensors configured to detect the target object, a type of sensors configured to detect the target object, and a detection frequency; and
   performing a safe driving control of the vehicle based on the degree of risk of the target object,
   wherein the degree of risk of the target object corresponds to a degree of desired attention to avoid the target object.

2. The method according to claim 1, wherein the detection result of the object around the vehicle includes a detection result of the object by the vehicle and a detection result of the object by another vehicle around the vehicle.

3. The method according to claim 1, wherein performing safe driving control of the vehicle includes:
   filtering the target object which is in the blind spot, or expected to enter the blind spot, based on the detection result of the object; and
   setting a range of the filtered target object.

4. The method according to claim 1, wherein when the target object is detected by a plurality of sensors, the degree of risk of the target object is set as a first degree of risk.

5. The method according to claim 4, wherein when the target object is detected by a single sensor, the degree of risk of the target object is set as a second degree of risk lower than the first degree of risk.

6. The method according to claim 5, wherein when the target object is detected by the single sensor and is detected at a predetermined frequency for a predetermined time, the degree of risk of the target object is set as a third degree of risk lower than the second degree of risk.

7. The method according to claim 1, wherein the safe driving control includes:
   reflecting the degree of the risk; and
   selectively collecting and managing at least one of generating a warning, reducing a speed, easing an entry condition of a brake assistance system, or eccentric driving of the vehicle based on the degree of the risk of the target object.

8. A vehicle comprising:
   a sensor configured to detect an object around the vehicle;
   a communicator configured to communicate with another vehicle; and
   a controller configured to:
      set a blind spot in a vicinity of the vehicle based on a detection result of the object by the sensor,
      detect a target object which is in the blind spot, or expected to enter the blind spot,
      determine a degree of risk of the target object based on a number of sensors configured to detect the target object, a type of sensors configured to detect the target object, and a detection frequency, and
      perform a safe driving control of the vehicle based on a degree of risk of a target object in the blind spot.

9. The vehicle according to claim 8, wherein the detection result of the object around the vehicle includes a result of object detection by the vehicle and a result of object detection by another vehicle around the vehicle.

10. The vehicle according to claim 8, wherein the controller, for the safe driving control of the vehicle, is configured to filter the target object which is in the blind spot, or expected to enter the blind spot, based on the detection result of the object and to set a range of the filtered target object.

11. The vehicle according to claim 8, wherein the controller is configured to set the degree of risk of the target object as a first degree of risk when the target object is detected by a plurality of sensors, and wherein the degree of risk corresponds to a degree of desired attention to avoid the target object.

12. The vehicle according to claim 11, wherein the controller is configured to set the degree of risk of the target object as a second degree of risk lower than the first degree of risk when the target object is detected by a single sensor.

13. The vehicle according to claim 12, wherein the controller is configured to set the degree of risk of the target object as a third degree of risk lower than the second degree of risk when the target object is detected by the single sensor and is detected at a predetermined frequency for a predetermined time.

14. The vehicle according to claim 8, wherein the controller is configured to selectively collect and manage at least one of generating a warning, reducing a speed, easing an entry condition of a brake assistance system, or eccentric driving of the vehicle based on the degree of the risk of the target object.

15. A method of controlling a vehicle, the method comprising:
    setting a blind spot in a vicinity of the vehicle based on a detection result of an object around the vehicle;
    determining a degree of risk of a target object based on a number of sensors configured to detect a target object in the blind spot, a type of sensors, and a detection frequency; and
    performing a safe driving control of the vehicle by selectively collecting and managing at least one of generating a warning, reducing a speed, easing an entry control of a brake assisting system, or eccentric driving of the vehicle based on the degree of the risk of the target object.

16. The method according to claim 15, wherein the detection result of the object around the vehicle includes a result of object detection by the vehicle and a result of object detection by another vehicle around the vehicle.

17. A vehicle, comprising:
    a sensor configured to detect an object around the vehicle;
    a communicator configured to communicate with another vehicle; and
    a controller configured to:
        set a blind spot around the vehicle based on a detection result of the object around the vehicle,
        determine a degree of risk of a target object based on a number of sensors configured to detect the target object in the blind spot, a type of sensors, and a detection frequency, and
        perform a safe driving control of the vehicle by selectively collecting and managing at least one of generating a warning, reducing a speed, easing an entry condition of a brake assisting system, or eccentric driving of the vehicle based on the degree of the risk of the target object.

18. The vehicle according to claim 17, wherein the detection result of the object around the vehicle includes a result of object detection by the vehicle and a result of object detection by another vehicle around the vehicle.

* * * * *